United States Patent [19]

Lee, Jr.

[11] Patent Number: 4,822,982
[45] Date of Patent: Apr. 18, 1989

[54] AUTOMATIC CIRCUIT CONTROL FOR ELECTRICAL RESISTANCE COOKING APPARATUS

[76] Inventor: Maurice W. Lee, Jr., P.O. Box 25, Boley, Okla. 74829

[21] Appl. No.: 93,943

[22] Filed: Sep. 8, 1987

[51] Int. Cl.⁴ ............................................. H05B 1/02
[52] U.S. Cl. .................... 219/497; 219/501; 219/494; 219/295; 219/509; 99/358; 340/589
[58] Field of Search ............... 219/497, 494, 509, 492, 219/485, 295, 501, 506; 340/588, 589, 526, 664; 99/358

[56] References Cited

U.S. PATENT DOCUMENTS

| | | |
|---|---|---|
| 3,543,673 | 12/1970 | McDevitt et al. .................. 219/295 |
| 3,651,753 | 3/1972 | Schmidt .............................. 99/358 |
| 4,093,847 | 6/1978 | Walker et al. ...................... 219/295 |
| 4,244,284 | 1/1981 | Flavan, Jr. et al. ................. 99/358 |
| 4,262,191 | 4/1981 | Lepper et al. ...................... 99/295 |
| 4,554,440 | 11/1985 | Lee, Jr. . |

Primary Examiner—M. H. Paschall
Attorney, Agent, or Firm—Robert K. Rhea

[57] ABSTRACT

In an electric direct energy transfer cooker for quickly cooking food, particularly fowl such as chicken, contactably interposed between electrodes, a food doneness control circuit is connected with the supply current. The control circuit senses and stores, for reference, the peak value of the root mean square of current through the food as a function of its cooked condition and stops current to the electrodes in response to a decline in current value through the food equal to a predetermined percentage of the current peak.

13 Claims, 2 Drawing Sheets

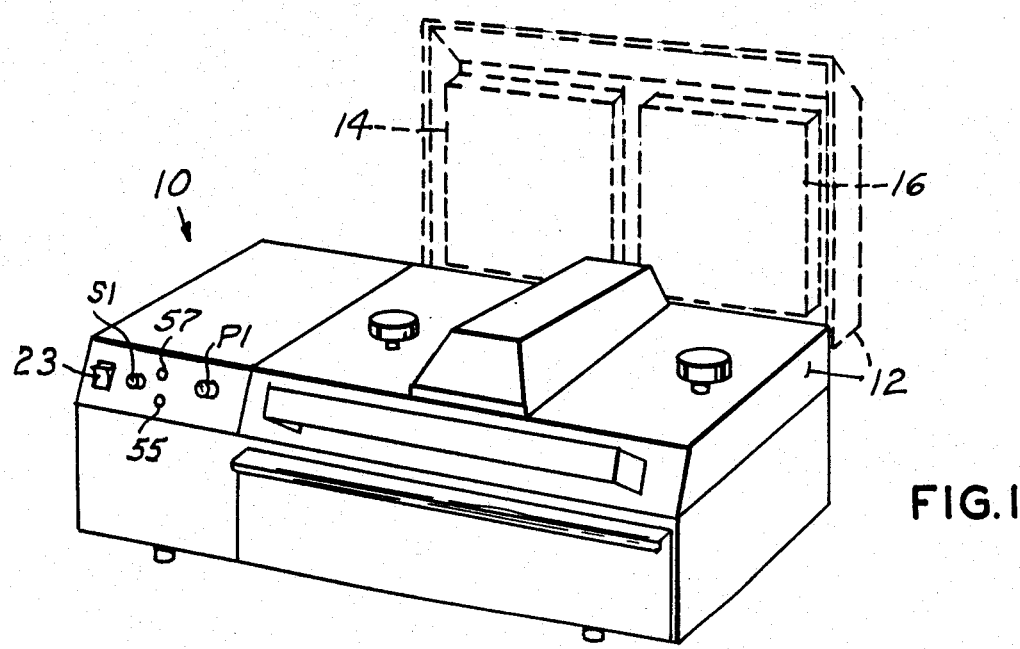
FIG. 1
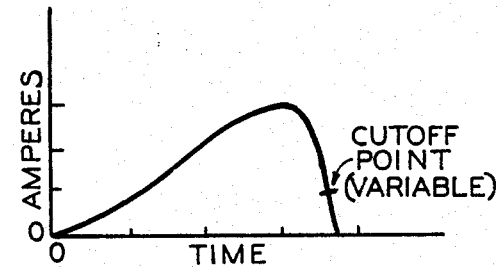
FIG. 5
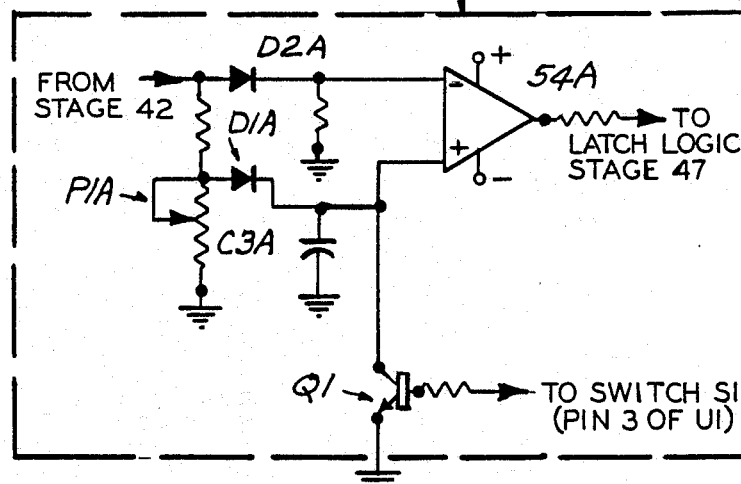
FIG. 3
| PINS | | PINS | | COOK |
| 6 | 7 | 3 | 5 | STATUS |
| --- | --- | --- | --- | --- |
| L | L | L | H | ON |
| H | L | H | L | OFF |
| L | H | H | L | OFF |
| H | H | H | L | OFF |
FIG. 4

AUTOMATIC CIRCUIT CONTROL FOR ELECTRICAL RESISTANCE COOKING APPARATUS

BACKGROUND OF THE INVENTION

1. Field of the Invention

The present invention relates to electrical resistance cooking and more particularly to a circuit detecting and interrupting the current at an optimum point in the cooking cycle.

2. Description of the Prior Art

This invention also relates to and the most pertinent prior patent is believed to be my U.S. Pat. No. 4,554,440 which discloses a housing containing a pair of electrodes underlying a third electrode for receiving a quantity of food stuff, such as ground meat, between the electrodes to be cooked by the electrical resistance of the food. A source of electrical energy is connected with the pair of electrodes to complete a circuit through the food and the third electrode.

When hamburger meat is cooked on the resistance cooking apparatus of the above named patent, the meat is believed to be sufficiently cooked at points on the cooking current curve between just before the current has peaked (rare) and to just after the current has peaked (well done) and has begun a decline typical of such meat cooking current. The above patent monitors the rate of change of the cooking current curve.

Chicken, although it has a current cooking curve similar to that of hamburger meat, is not considered to be "done" at or as it approaches the current peak nor just after the peak. The point on the cooking curve is further down the declining curve at a point approximately equaling $\frac{1}{3}$ or $33\frac{1}{3}\%$ of the current peak. This point was determined by empirical data and may vary slightly from meat to meat.

The doneness detection circuit must not only detect when this point is reached and stop the cooking process, but must also be immune to sizable snap fluctuations in the cooking current common when cooking chicken. These fluctuations are caused by minor steam explosions in the meat generated by heat during the cooking process.

The circuit of this invention filters these transitory fluctuations and is responsive to the magnitude of the current through the food and discontinues the current at an optimum cooked condition of the food.

SUMMARY OF THE INVENTION

In one embodiment, an electrical resistance cooking apparatus, having a pair of electrodes respectively connected with a source of alternating current completes a circuit through a third electrode and food, such as chicken, interposed there between. A transformer and triac are interposed in series in one of the AC power supply wires to one electrode. The voltage induced in the transformer secondary is a direct reflection of the current passing through meat being cooked. This voltage is rectified and applied to a primary stage connected in series with a filter stage in turn connected to a variable gain amplifier in parallel with a voltage peak detection capacitor having their outputs connected with a comparator stage in turn connected to a latching relay.

When the output of the variable gain amplifier equals the reciprocal of its selected gain, the comparator stage output signal goes high and biases the latching relay to stop conduction to ground thereby interrupting current through the food. A triac driver, energized by momentarily closing a current cooking start switch, energizes a gate circuit for triggering the source wire triac. A short duration (four second) timer, also energized by the closing of the start switch, biases a second transistor conductive and temporarily grounds the output of the comparator stage to insure a start cooking circuit function.

In another embodiment, the variable gain amplifier is omitted and the output of the filter stage is connected in parallel to the comparator and a current peak detection stage in a manner to feed a reference voltage directly to the comparator.

The principal objects are to provide a circuit for cooking food by direct energy transfer from a continuous cycle current; automatically discontinue food cooking current at an optimum condition of the food; prevent under cooking or over cooking the food; and in which the done condition of the food may be preselected prior to initiating the cooking function.

BRIEF DESCRIPTION OF THE DRAWINGS

FIG. 1 is a perspective view of the apparatus illustrating, by dotted lines, its food receiving lid in raised position;

FIG. 3 is a diagram of an alternative current peak detection stage;

FIG. 4 is a table listing the circuit values on the latching relay pins necessary for a cooking or noncooking action of the apparatus; and, FIG. 5 is a graph of the current vs time illustrating the variable "cutoff" point.

DESCRIPTION OF THE PREFERRED EMBODIMENTS

Figure 2:
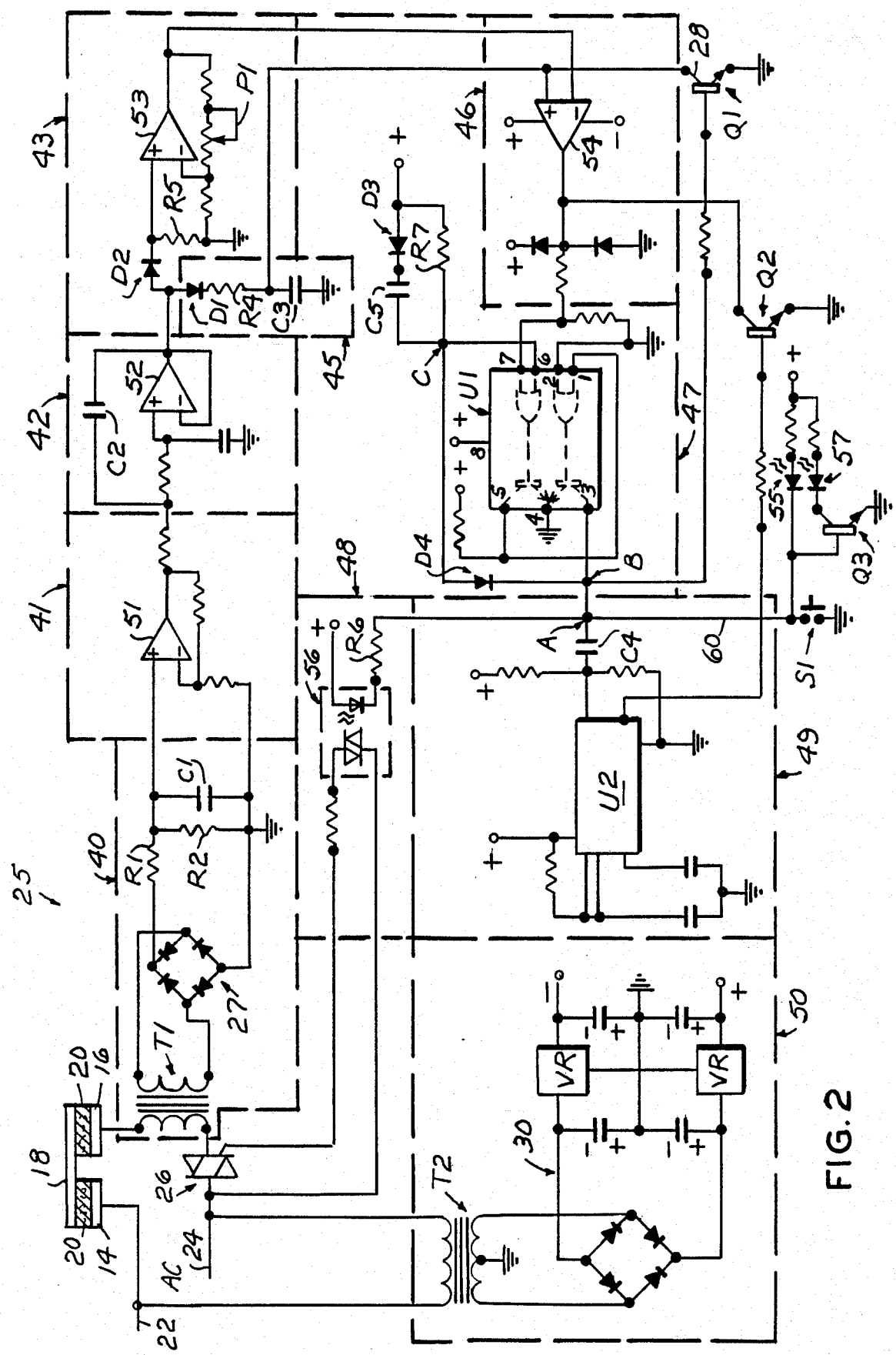
FIG. 2 is a wiring diagram.

Like characters of reference designate like parts in those figures of the drawings in which they occur.

In the drawings:

Referring to FIGS. 1 and 2, the reference numeral 10 indicates a meat cooking apparatus comprising a rectangular housing containing the circuit 25 of FIG. 2 and having a base portion 11 and an overlying lid portion 12 hingedly connected with the housing to be lifted to its dotted line position for receiving food. The housing lid supports first and second electrodes 14 and 16 and the housing base supports a third electrode 18 (FIG. 2) underlying and bridging the first and second electrodes when food to be cooked, such as chicken 20, is disposed in spaced relation on the third electrode 18 and respectively contacted by the first and second electrodes when the lid 12 is closed. The electrodes 14–18 are preferably plate-like and their arrangement in FIG. 1 may be reversed, as illustrated by FIG. 2.

A source of electrical energy AC represented by the wires 22 and 24 are connected, through an on-off switch 23 (FIG. 1), respectively with the electrodes 14 and 16. A transformer T1 has its primary winding interposed in series in the source wire 24 for the purpose presently explained.

The meat cooking function is similar to the hamburger meat cooking action in the above named patent. Briefly stated, when the lid 12 is closed on meat 20 interposed between the superposed electrodes, a series circuit is completed through the electrodes and meat. The current starts at zero and gradually raises each second to a peak near the "done" condition of the food where the current declines rapidly in comparison to its rise.

Time is not a controlling factor in this cooking operation and varies with the mass of the food (chicken) and particularly with the quantity of contained moisture. The curve of the current is the RMS (root mean square) values of the current through the food and the shape of the curve remains constant from one food sample to another, although the RMS values do not (FIG. 5).

The numeral 25 indicates a circuit for detecting the current rent peak and stopping the current following its resistance peak to discontinue the cooking of the food, such as chicken, 20 in accordance with many variables, such as its thickness, moisture, fat or other chemical content. The circuit 25 is formed by a series of stages, stage 40 detecting the cooking current, an amplifier stage 41, a filter stage 42, peak detection stages 43 and 45, a comparator stage 46, a latching relay stage 47, a triac driver 48, an override timer circuit 49 and a component direct current power supply 50.

A triac 26 (bidirectional triode thryristor) is connected in series in the wire 24 between its AC source and transformer T1 and acts as a current valve as current is applied to or removed from its gate to bias it off and on and deenergize or energize the transformer T1, as presently explained.

In addition to the transformer T1, the cooking current detection stage 40 comprises a full wave rectifier formed by a diode bridge 27. As mentioned hereinabove, the voltage induced in the secondary winding of the transformer T1 is a direct reflection of the current through the meat 20 as it is being Q cooked. The rectified signal is reduced and filtered by resistors R1 and R2 and a capacitor C1. The resulting signal is a voltage which increases, peaks and then decreases in direct proportion to the current passing through the meat 20. This signal is fed to the amplifier circuit stage 41.

The amplifier stage 41 consists of an operational amplifier 51 which serves as a buffer to prevent electrical overloading that would adversely affect the following filter circuit 42. This operational amplifier 51 generates a small gain in the signal to more correctly position the signal voltage to the succeeding operational amplifier 52 in the filter circuit stage 42.

The filter stage 42 is a second order low pass Chebyschev filter with a 5 Hertz cut-off including the operational amplifier 52 having a feedback to its negative input and a feedback to its positive input through a capacitor C2. As mentioned hereinabove, steam created in the cooking of the meat 20 causes momentary changes in the cooking current amplitude. The purpose of this filter is to remove any transitory signal voltage fluctuation caused by such momentary changes in the cooking current.

The output of the filter stage 42 is simultaneously fed to the peak detection stage 43 and peak detection capacitor C3 and reset stage 45. The signal passes through a diode D1 and a resistor R4 to one terminal of a capacitor C3 having its other terminal connected with ground. The purpose of the diode D1 is to prevent discharge of the capacitor C3 after the signal peak has passed. The diode connected side of the capacitor is fed to the noninverting positive input of a comparator amplifier 54 (in the comparator stage 46) and to the collector 28 of a first transistor Q1 having its emitter connected to ground. The purpose of the transistor Q1 is to reset the capacitor C3 to zero voltage on the start up of a new cooking cycle as presently explained. The resistor R4 limits the signal from the output of the filter stage 42 from possible action of the resetting of transistor Q1.

A diode D2 is connected in series in the output of the filter stage 42 to the positive input of an operational amplifier 53 to obtain the same voltage drop that the peak detection capacitor C3 is subjected to by its charging diode D1. A charge/bleed resistor R5 is used to insure the voltage at the positive input of this operational amplifier 53 tracks the voltage on the other side of its diode D2 even when the voltage is declining. If the gain of the operational amplifier 53 has been set to 3 for example, its output will match the voltage of the peak detection capacitor C3 at a point when the cooking signal voltage has declined to an amplitude of 33166 % of its former peak. The gain of the amplifier 53 may be varied by a potentiometer P1, connecting its output to its negative input, such that the signal cutoff point may be changed from 20% to 80% of its former peak. Thus the potentiometer P1 serves as a "doneness" control. The output of this amplifier 53 is fed to the negative input of the comparator amplifier 54.

This amplifier 54, in the comparator stage 46, is used as a comparator to detect that point in the cooking signal current equal to that "memorized" by the peak detection capacitor C3. As stated hereinabove, if the gain of the variable amplifier 53 is set to 3, this point will be 33⅓% of the former peak current. The memorized voltage of the peak detection capacitor C3 is present at the positive input of the comparator 54. During the cooking process, the output of the variable gain amplifier 53 will always be multiplied by the gain. For example, when the gain is set to 3 the output of the variable gain amplifier 53 will be three times that of the peak detection capacitor C3 until the cooking signal voltage decline begins. At that time the peak detection capacitor C3, since it has no exit path for its charge, retains its peak voltage while the output of the variable gain amplifier 53 declines. When the output of amplifier 53 has declined to a point from that of its prior peak which is equal to the reciprocal of the gain, (this point will be ⅓ or 33⅓% of the peak signal when the gain is 3) it crosses the peak reference voltage of the detection capacitor C3 and the output from the comparator 54, which has been low, goes high to signal doneness of the meat 20. This food cooked signal from the amplifier 54 is applied to pin 7 of a latching relay U1 in the relay stage 47 to terminate the cooking action as presently explained.

The purpose of the latching relay stage 47 is to hold the circuit output in the "cook" position following closing the push-button cooking start switch S1.

The latching relay stage 47 includes a peripheral driver U1 (#SN75464P) wired to perform a latching function of the cooking circuit, as presently explained, and also provide the output power necessary for energizing both a cooking indicator LED lamp 55 (FIGS. 1 and 2) and the opto-isolated triac driver 56.

The inputs of the relay U1 "OR" gates are respectively connected with pins 1-2 and 6-7 with the OR gates outputs respectively connected with the respective base of their two transistors. The emitters of the transistors are connected to ground through pin 4. The collectors of the two transistors are respectively connected with pins 3 and 5. Pins 1 and 5 are connected with the positive potential. OR gate connected pin 7 is connected with the cooking signal from the amplifier 54. "OR" gate pin 2 is tied to ground. The positive potential is applied to a circuit junction C through a network comprising a series connected diode D3 and capacitor C5 connected in parallel with a resistor R7 to the junction C. The junction C being connected with the OR gate input pin 6 and to relay U1 pin 3 through a CR302 diode D4 forming a junction B which is connected with the base of transistor Q1. The circuit junction B is also connected with the timer U2 of the override timer circuit 49 through a circuit junction A and capacitor C4.

A lead 60 connects the starting switch S1 with one terminal of the triac driver 56 in series through the junction A, and a resistor R6 with the other terminal of the triac driver connected with the positive potential. The cathode terminal of the visual cooking indicator LED diode 55 having its anode connected with positive potential is also connected with the junction A. A LED diode 57 is connected to positive potential in parallel with the diode 55 with its cathode connected with the collector of a third transistor Q3 having it base connected with the junction A and its emitter grounded.

The purpose of the triac driver 56, in addition to triggering the gate of the triac 26, is providing total electrical isolation between the relatively low voltage of the cooking control circuitry and the relatively high voltage of the AC current on the main line triac 26.

The override timer circuit 49 is provided to hold the logic relay or latching circuit 47 to the "on" position for approximately 4 seconds. This is to give the meat time to start conducting current and prevent premature turn-off. Its main component consists of a timer U2 designed with a RC constant to provide approximately a four second signal. Q When switch S1 is closed, current flows through resistor R6. This not only causes the triac driver 56 to energize, but it also creates an initial transient voltage pulse. This transient voltage pulse, created by the beginning of current through resistor R6, is reflected across capacitor C4. This voltage pulse in turn triggers the timer U2 to start timing. The length of time is controlled by the RC constant of its capacitor C4 and associated resistors. The timer 4 second signal output is applied to its pin 3 connected with the base of a second transistor Q2. The collector of transistor Q2 is connected with the output of the comparator amplifier 54 and its emitter is connected to ground.

The power circuit 50 comprises a second transformer T2 having its primary winding connected with the AC source wires 22 and 24. The output of the secondary of the transformer T2 is rectified and connected with conventional circuitry 30 to provide a relatively low voltage direct current source for the power terminals of the several amplifiers, latching relay U1, timer U2 and triac driver 56.

Normally, the latching relay should rest in an "off" configuration (pin 3=high). The lower driver in relay U1, as viewed in FIG. 2, (pins 3, 2, 1) is wired as a simple inverter. Therefore, the "on" condition that results when the signal on pin 3 is low is actually a result of the signal on pin 5, in the upper driver being high. The "Truth" table for the logic throughput of relay U1 is shown by FIG. 4. This table, which utilizes L=low potential electrical signal (open switch) and H=high potential electrical signal (closed switch), shows cooking occurs only when pins 6 and 7 are both low. When the relay is at rest (pin 6=high), then any action on pin 7 will not trigger the relay (see FIG. 4). However, when the "start" switch S1 is depressed, simultaneous lows appears on both pin 6 directly (because points A, B, through diode D4 to C are now tied to ground), and pin 7 indirectly. The indirect action on pin 7, of the relay, is a result of the timer U2 being triggered when the "start" switch S1 is depressed, the output of which yanks the comparator 54 output signal entering pin 7 low by tying it to ground through transistor Q2 (the base of transistor Q2 is rendered conductive by the start of timer U2). This produces the desired lows on pins 6 and 7 that result in the relay latched "on" condition.

With the release of the "start" switch S1, the relay remains mains set because the resulting low on the output of its pin 3 now holds pin 6 low (again through point B through diode D4 to point C, which is the same as pin 6). Relay pin 3 is low because the transistor in the lower driver of relay U1 is made to conduct because of the high signal fed from pin 5 through pin 1. The conduction of this relay transistor ties its pin 3 to ground at pin 4. Diode D4 serves to provide isolation of pin 6 from the +15 volt logic high that would result on that pin in the absence of diode D4 during the "cooker off" condition.

Thus, as mentioned hereinabove a cooking done (high) signal applied to latch relay pin 7 causes the transistor to conduct at pin 5 thus connecting it to ground through its pin 4. The low at pin 5 now appears at pin 1. Pin 2 is tied to ground and is therefore low. This results in a low output to the transistor at pin 3, thus stopping its conduction to ground (pin 4). When conduction to ground of points A and B stops through pin 3, then voltage through R7 and diode D4 appears at pin 3 making pin 3 high and interrupting current through the triac 26 and releasing the relay "on" condition. When pin 3 becomes high it causes Q1 to conduct, thereby grounding the detection capacitor C3, (resetting it to zero for another cooking cycle). Interrupting the ground connection from pin 3 also biases the base of transistor Q3 conductive thus energizing LED diode 57 and signaling a food cooked or "done" condition.

Obviously, changes may be made in the circuit to monitor the magnitude of the current cooking curve and its percentage of decline. The numeral 43A (FIG. 3) indicates an alternative circuit for the peak detection stage. The cooking current signal from the filter stage 42 is simultaneously fed to a comparator amplifier 54A through a diode D2A and through a potentiometer P1A having the normally free end of its resistance grounded. The potentiometer P1A feeds a proportion of the voltage to the positive input of the amplifier 54A through a diode D1A and a peak detection capacitor C3A. The diode D1A similarly prevents discharge of the capacitor C3A. This proportional voltage is similarly varied by the potentiometer P1A to any selected value from 0% to 100% (33⅓% being preferred) of the signal input from the filter stage 42. The capacitor C3A is similarly connected with the collector of transistor Q1.

As before, the output of the amplifier 52 in the filter stage will reflect the current through the meat starting at zero, rising to a peak and then declining. This signal is fed into amplifier 54A which has a gain of 1. The signal from the potentiometer P1A, which is a portion of that from the filter section 42, is impressed on the peak detection capacitor C3A performing a function similar to the above described capacitor C3. The capacitor C3A retains a charge as controlled by the potentiometer P1A. In this case, 33⅓% of the peak voltage received from the filter stage 42. When the output of the amplifier 54A declines to a value equal to the reference voltage across the capacitor C3A, the comparator amplifier 54A biases Q the relay pin 7 high to stop the cooking as described hereinabove.

Obviously the invention is susceptible to changes or alterations without defeating its practicability. Therefore, I do not wish to be confined to the preferred embodiment shown in the drawings and described herein.

I claim:

1. A food cooking control for an electric resistance cooker in which the magnitude of the RMS value of electrode current generated from an AC source passing through food interposed between electrodes increases, peaks and declines to a predetermined value before the food is cooked, the improvement comprising:

an electric supply circuit;

thyristor means arranged in series in the electric supply circuit, said thyristor means including a gate control element having a gate voltage supply circuit;

switch means in said gate voltage supply circuit for closing the gate voltage circuit and rendering said thyristor means conductive;

switch means in said gate voltage supply circuit for closing the gate voltage circuit and rendering said thyristor means conductive;

current detection means including a current transformer and a filter/amplifier/comparator circuit connected with the electric supply circuit for sensing the change of the RMS value of current through the food as a function of its cooked condition;

capacitor means in the current detection circuit for storing a charge of the current peak as a reference voltage value; and, switch operator means including a latching relay circuit interposed between said current detection means and said switch means for maintaining said thyristor means conductive and responsive to the current detection means for opening the gate voltage supply circuit in response to cooking current decline equal in value to a predetermined percent of the current peak reference voltage across said capacitor means.

2. The combination according to claim 1 in which said current detection means includes:

first visual means indicating when said food is cooking; and, second visual means indicating when said food is cooked.

3. The combination according to claim 1 in which said switch means includes:

a starting switch for initially energizing said gate voltage supply circuit and grounding any residual voltage in the detection means circuit.

4. The combination according to claim 3 in which said switch operator means circuit further includes:

a first transistor interposed between the capacitor means and the latching relay circuit for resetting the capacitor means to zero when the latching relay circuit biases the first transistor conductive by opening the gate voltage supply circuit.

5. The combination according to claim 4 in which said amplifier/comparator circuit includes a current peak detection operational amplifier and further including:

adjustable resistance means for setting the gain of the operational amplifier to predetermined percent of the current peak to insure a food well done setting.

6. The combination according to claim 5 and further including:

a second transistor connecting the output of said amplifier/comparator circuit with ground;

timer circuit means including a timer connected with said starting switch and the base of said second transistor for temporarily biasing said second transistor conductive in response to closing said gate voltage circuit.

7. The combination according to claim 4 in which the filter portion of said current detection means removes transitory voltages in the circuit caused by steam disturbances during the cooking process for preventing interruption of the cooking process.

8. The method of controlling power input during electrical resistance cooking of food, comprising:

interposing food to be cooked between spaced-apart electrodes;

uninterruptedly applying continuous cycle electric potential across the electrodes;

continually sensing the rise and decline of current passing through the food to determine its peak value; and, discontinuing the electrode current when its declining value equals the reciprocal of its peak value of the RMS value of the current as a function of the cooked condition of the food indicating the end of the cooking process and a selected cooking doneness of the food.

9. The method of cooking food in an electrical resistance cooker in which the magnitude of electrode current generated from an AC source passing through food between electrodes peaks and declines before the food is substantially cooked, comprising:

selecting a desired done condition of the food to be cooked;

uninterruptedly applying the continuous cycle AC source to the electrodes;

continually sensing the RMS value of the electrode current to determine its peak, in passing through the food; and, discontinuing the electrode current when its declining value equals the reciprocal of the peak of the RMS value of the electrode current magnitude as a function of the cooked condition of the food indicating the end of the cooking process and a selected cooking doneness.

10. A method for electrically cooking food as disposed between first and second electrodes, comprising the steps of:

uninterruptedly passing continuous cycle current from an alternating current electric source between said first and second electrodes through said food; and, allowing said current to flow continuously without interruption through the food until ceasing current flow when the RMS value of the current following a peak value is equal to the reciprocal of the peak value which yields a selected cooking doneness of the food.

11. A method as set forth in claim 10 wherein said reciprocal of the current peak value is one third of the peak current value.

12. A method as set forth in claim 10 wherein said reciprocal of the current peak value is between 20% and 80% of the peak current value.

13. A food cooking control for an electric resistance cooker in which the magnitude of the RMS value of electrode current generated from an AC source passing through food interposed between electrodes increases, peaks and declines to a predetermined value before the food is cooked, the improvement comprising:

an electric supply circuit;

thyristor means arranged in series in the electric supply circuit, said thyristor means including a current transformer and a gate control element having a gate voltage supply circuit;

current detection means including a filter/amplifier/comparator circuit connected with the electric supply circuit for sensing the change of the RMS value of current through the food as a function of its cooked condition;

switch means including a starting switch in said gate voltage supply circuit for closing the gate voltage circuit and rendering said thyristor means conductive and grounding any residual voltage in the detection means circuit;

capacitor means in the current detection circuit for storing a charge of the current peak as a reference voltage value;

switch operator means including a latching relay circuit interposed between said current detection means and said switch means for maintaining said thyristor means conductive and responsive to the current detection means for opening the gate voltage supply circuit in response to cooking current decline equal in value to a predetermined percent of the current peak reference voltage across said capacitor means; and, transistor means interposed between the capacitor means and the latching relay circuit for discharging the capacitor means when the latching relay circuit biases the transistor means conductive by opening the gate voltage supply circuit.

* * * * *